United States Patent
Sakai et al.

(10) Patent No.: US 7,955,741 B2
(45) Date of Patent: Jun. 7, 2011

(54) FUEL CELL, ELECTRONIC DEVICE, MOVABLE BODY, POWER GENERATION SYSTEM, AND CONGENERATION SYSTEM

(75) Inventors: Hideki Sakai, Kanagawa (JP); Takashi Tomita, Kanagawa (JP); Atsushi Sato, Kanagawa (JP); Yuichi Tokita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1118 days.

(21) Appl. No.: 11/570,113

(22) PCT Filed: Jun. 7, 2005

(86) PCT No.: PCT/JP2005/010415
§ 371 (c)(1), (2), (4) Date: Mar. 13, 2007

(87) PCT Pub. No.: WO2005/122315
PCT Pub. Date: Dec. 22, 2005

(65) Prior Publication Data
US 2007/0218345 A1 Sep. 20, 2007

(30) Foreign Application Priority Data

Jun. 7, 2004 (JP) ............... P2004-168430
May 31, 2005 (JP) ............... P2005-159092

(51) Int. Cl.
*H01M 4/90* (2006.01)
*H01M 4/60* (2006.01)

(52) U.S. Cl. .......................... 429/401; 429/2
(58) Field of Classification Search ............... 429/2, 401
See application file for complete search history.

(56) References Cited

U.S. PATENT DOCUMENTS

| | | |
|---|---|---|
| 6,294,281 B1 | 9/2001 | Heller |
| 2002/0025469 A1 | 2/2002 | Heller |
| 2003/0079480 A1 | 5/2003 | Emmer et al. |
| 2003/0152823 A1 | 8/2003 | Heller |
| 2003/0211176 A1 | 11/2003 | Suzuki et al. |
| 2005/0053825 A1 | 3/2005 | Sakai et al. |

FOREIGN PATENT DOCUMENTS

| | | |
|---|---|---|
| JP | 08-196274 | 8/1996 |
| JP | 8-196274 | 8/1996 |
| JP | 2000-133297 | 5/2000 |
| JP | 2002-012547 | 1/2002 |
| JP | 2003-282124 | 10/2003 |
| JP | 2004-071559 | 3/2004 |
| JP | 2005-13210 | 1/2005 |
| JP | 2005-013210 | 1/2005 |
| JP | 2005-149771 | 6/2005 |
| WO | 03/079480 | 9/2003 |

OTHER PUBLICATIONS

Wheals et al., "Fuel ethanol after 25 years", TIBTECH Dec. 1999 (vol. 17), pp. 482-487.*

* cited by examiner

*Primary Examiner* — Patrick Ryan
*Assistant Examiner* — Ladan Mohaddes
(74) *Attorney, Agent, or Firm* — K&L Gates LLP

(57) ABSTRACT

A fuel cell which can directly extract electric power from a polysaccharide, such as starch, is provided. A fuel electrode is formed by immobilizing with an immobilizer, on an electrode comprised of, e.g., carbon, an enzyme responsible for decomposing a polysaccharide into monosaccharides, an enzyme responsible for decomposing the monosaccharide formed, a coenzyme (e.g., $NAD^+$ or $NADP^+$) which forms a reductant due to the oxidation reaction in the monosaccharide decomposition process, a coenzyme oxidase (e.g., diaphorase) for oxidizing the reductant of the coenzyme (e.g., NADH or NADPH), and an electron mediator (e.g., ACNQ or vitamin K3) for receiving electrons generated due to the oxidation of the coenzyme from the coenzyme oxidase and delivering the electrons to the electrode. The fuel cell comprises the fuel electrode and the air electrode that sandwich an electrolyte layer.

5 Claims, 13 Drawing Sheets

FUEL CELL, ELECTRONIC DEVICE, MOVABLE BODY, POWER GENERATION SYSTEM, AND COGENERATION SYSTEM

CROSS REFERENCE TO RELATED APPLICATIONS

The present application claims priority to Japanese Patent Document Nos. 2004-168430 filed on Jun. 7, 2004 and 2005-159092 filed on May 31, 2005, the disclosures of which are herein incorporated by reference.

BACKGROUND ART

The present invention relates to a fuel cell using an enzyme as a catalyst, an electronic device, a movable body, a power generation system, and a cogeneration system.

A fuel cell basically comprises a fuel electrode (negative electrode), an oxidizer electrode or air electrode (positive electrode), and an electrolyte (proton conductor), and has an operational principle, in accordance with a reverse reaction of the electrolysis of water, such that hydrogen and oxygen are reacted to form water ($H_2O$) and generate electricity. Specifically, a fuel (hydrogen) supplied to the fuel electrode is oxidized and divided into electrons and protons ($H^+$), and the electrons go to the fuel electrode and the protons $H^+$ travel through the electrolyte to the oxidizer electrode. At the oxidizer electrode, the protons $H^+$ are reacted with oxygen supplied from the outside and electrons fed from the fuel electrode through an external circuit to form $H_2O$.

The fuel cell is a high-efficient power generator which directly converts the chemical energy of a fuel to electrical energy, and can extract electrical energy from the chemical energy of fossil energy, such as natural gas, petroleum, or coal, with high conversion efficiency, irrespective of where or when the fuel cell is used. For this reason, conventionally, fuel cells in large-scale power generation applications and others have been extensively researched and developed. For example, fuel cells are mounted on a space shuttle, which has demonstrated that the fuel cells can supply not only electric power but also water for a crew, and that the fuel cells are clean power generators.

Further, in recent years, fuel cells operating in a range of relatively low temperatures of from room temperature to about 90° C., such as solid polymer fuel cells, are developed and have attracted attention. Therefore, attempts are being made to apply the fuel cell not only to the large-scale power generation but also to small-size systems, such as a power source for driving an automobile, and a portable power source for personal computer or mobile device.

As mentioned above, the fuel cell is possibly applied to a wide range of uses from the large-scale power generation to the small-scale power generation, and has attracted considerable attention as a high-efficient power generator. However, the fuel cell has various problems in that the fuel cell generally uses, as a fuel, hydrogen gas converted by means of a reformer from natural gas, petroleum, or coal, and hence consumes limited resources and requires high-temperature heating, and that the fuel cell needs a catalyst comprised of an expensive noble metal, such as platinum (Pt). In addition, when hydrogen gas or methanol itself is directly used as a fuel, it must be carefully handled.

For solving the problems, the application of biological metabolism proceeding in a living body, which is a high-efficient energy conversion mechanism, to a fuel cell has been proposed. The biological metabolism used here includes respiration, photosynthesis, and the like conducted in microorganism somatic cells. The biological metabolism has advantageous features not only in that the power generation efficiency is extremely high, but also in that the reaction proceeds under mild conditions at about room temperature.

For example, respiration is a mechanism such that microorganisms or cells take in nutrients, such as saccharides, fat, and protein, and, during the formation of carbon dioxide ($CO_2$) through the glycolytic pathway and tricarboxylic acid (TCA) cycle having a number of enzyme reaction steps, nicotinamide adenine dinucleotide ($NAD^+$) is reduced to form reduced nicotinamide adenine dinucleotide (NADH), thus converting the chemical energy of the nutrients to redox energy, i.e., electrical energy, and further, in the electron transport system, the electrical energy of NADH is directly converted to proton-gradient electrical energy and oxygen is reduced to form water. The resultant electrical energy forms ATP from adenosine diphosphate (ADP) through adenosine triphosphate (ATP) synthase, and ATP is utilized in the reactions required for living of microorganisms or cells. This energy conversion is carried out in cytosol and mitochondria.

Photosynthesis is a mechanism such that, during the conversion of the optical energy taken in to electrical energy by reducing nicotinamide adenine dinucleotide phosphate ($NADP^+$) through the electron transport system to reduced nicotinamide adenine dinucleotide phosphate (NADPH), water is oxidized to form oxygen. The resultant electrical energy is utilized in a carbon fixing reaction by taking in $CO_2$ and a synthesis of carbohydrates.

As a technique for utilizing the above-mention biological metabolism in a fuel cell, a microorganism battery in which electrical energy generated in microorganisms is removed from the microorganisms through an electron mediator and the resultant electrons are delivered to an electrode to obtain an electric current has been reported (see, for example, Unexamined Japanese Patent Application Laid-Open Specification No. 2000-133297).

However, microorganisms and cells have many functions other than the desired reactions including the conversion of chemical energy to electrical energy. Therefore, in the above method, an undesired reaction consumes the electrical energy, making it difficult to achieve a satisfactory energy conversion efficiency.

For solving the problem, a fuel cell in which only a desired reaction is advanced using an enzyme and an electron mediator has been proposed (see, for example, Japanese Patent Application Publication Nos. 2003-282124 and 2004-71559). In this fuel cell, a fuel is decomposed into protons and electrons by an enzyme, and fuel cells using as a fuel an alcohol, such as methanol or ethanol, or a monosaccharide, such as glucose, have been developed.

However, the above-mentioned conventional fuel cell using alcohol or glucose as a fuel is unsatisfactory in power generation efficiency, and hence is difficult to put into practical use.

Accordingly, a task to be achieved by the present invention is to provide a fuel cell which is advantageous not only in that it can directly extract electric power from a polysaccharide to achieve high-efficient power generation, but also in that it does not require limited fossil fuel and contributes to the realization of resource circulation society.

Another task to be achieved by the present invention is to provide an electronic device, a movable body, a power generation system, and a cogeneration system using the above excellent fuel cell.

SUMMARY

The present inventors have conducted extensive and intensive studies with a view toward solving the above-mentioned problems accompanying the prior art technique. The studies are briefly described below.

Glucose used as a fuel in the above-mentioned conventional fuel cell is produced by industrially decomposing a variety of polysaccharides. On the other hand, in the natural world, substances in the form of monosaccharides including glucose are not present, and many substances are present in the form of polysaccharides. Generally, organisms do not obtain energy from glucose, and actually obtain energy by taking in polysaccharides and decomposing them by an enzyme. Such extraction of energy from polysaccharides has been realized in a biomass system and the like using, e.g., garbage as a fuel. This system produces a chemical substance, such as hydrogen gas or methanol, by biomass, and many of the chemical substances produced provide heat energy by burning them. Further, heat generated by biological actions is utilized to obtain heat energy. The heat energy is converted to kinetic energy using a turbine or the like, and further converted to electrical energy by a power generator. On the stages of energy conversion, energy loss occurs and the energy of the fuel is considerably wasted.

Therefore, when a fuel cell that uses polysaccharides present in the natural world as a fuel to generate electric power can be realized, electrical energy can be directly extracted from not only garbage but also chemical substances produced in the natural world (e.g., starch and cellulose), thus making it possible to obtain electric power without using limited fossil fuel. Further, garbage or waste paper can be effectively utilized and hence the amount of waste is reduced, which contributes to the realization of resource circulation society. Furthermore, plants fix $CO_2$ in air in the synthesis of polysaccharides by photosynthesis, which possibly contributes to the reduction of $CO_2$ in air which is a current problem.

The present inventors have made extensive and intensive studies. As a result, it has been found that the use of a polysaccharide, such as starch, as a fuel in the fuel cell can solve all the above problems, and the present invention has been completed.

Specifically, for solving the above problems, the first invention in an embodiment is directed to a fuel cell for generating electric power by decomposing a fuel using an enzyme, characterized in that the fuel contains a polysaccharide.

The second invention in an embodiment is directed to an electronic device using a fuel cell, characterized in that the fuel cell generates electric power by decomposing a fuel using an enzyme, wherein the fuel contains a polysaccharide.

The third invention in an embodiment is directed to a movable body using a fuel cell, characterized in that the fuel cell generates electric power by decomposing a fuel using an enzyme, wherein the fuel contains a polysaccharide.

The fourth invention in an embodiment is directed to a power generation system using a fuel cell, characterized in that the fuel cell generates electric power by decomposing a fuel using an enzyme, wherein the fuel contains a polysaccharide.

The fifth invention in an embodiment is directed to a cogeneration system using a fuel cell, characterized in that the fuel cell generates electric power by decomposing a fuel using an enzyme, wherein the fuel contains a polysaccharide.

The fuel cell in each of the first to fifth inventions generally has a structure comprising a positive electrode and a negative electrode that sandwich a proton conductor.

In the fuel cell, by decomposing a polysaccharide using an enzyme, electrical energy can be directly extracted from the polysaccharide.

Examples of polysaccharides usable as a fuel in the fuel cell (polysaccharides in a broad sense, meaning any carbohydrates that form two molecules or more of monosaccharides by hydrolysis, and including oligosaccharides, such as disaccharides, trisaccharides, and tetrasaccharides) include starch, amylose, amylopectin, glycogen, cellulose, maltose, sucrose, and lactose. These comprise two or more monosaccharides bonded together, and each polysaccharide contains glucose as a monosaccharide which is a bonding unit. Amylose and amylopectin are components of starch, and starch is a mixture of amylose and amylopectin. As the fuel, any fuel can be used as long as it contains a decomposable polysaccharide, and the fuel may contain glucose which is a decomposition product of a polysaccharide. Therefore, garbage or the like can be used as a fuel.

In the fuel cell, as the enzyme, at least a decomposing enzyme for promoting decomposition, e.g., hydrolysis of the polysaccharide to form a monosaccharide, e.g., glucose and an oxidase for promoting oxidation of the monosaccharide formed to decompose it are used. Further, a coenzyme oxidase for changing a coenzyme reduced by the oxidase to an oxidant is also used.

When the reduced coenzyme is changed to an oxidant due to the action of the coenzyme oxidase, electrons are generated, and the electrons are delivered from the coenzyme oxidase to an electrode (negative electrode) through an electron mediator. As the coenzyme, for example, $NAD^+$ is used, and, as the coenzyme oxidase, for example, diaphorase is used.

In the fuel cell using glucoamylase as the decomposing enzyme for decomposing a polysaccharide and using glucose dehydrogenase as the oxidase for decomposing a monosaccharide, a polysaccharide decomposable into glucose by glucoamylase, for example, a substance comprising any one of starch, amylose, amylopectin, glycogen, and maltose can be used as a fuel to generate electric power. Glucoamylase is a decomposing enzyme that hydrolyzes an α-glucan, such as starch, to form glucose, and glucose dehydrogenase is an oxidase that oxidizes β-D-glucose to D-glucono-δ-lactone.

In the fuel cell using cellulase as the decomposing enzyme and using glucose dehydrogenase as the oxidase, cellulose decomposable into glucose by cellulase can be used as a fuel. Cellulase is, more specifically, at least one member selected from cellulase (EC 3.2.1.4), exocellobiohydrase (EC 3.2.1.91), and β-glucosidase (EC 3.2.1.21). As the decomposing enzyme, a mixture of glucoamylase and cellulase may be used, and, in this case, the decomposing enzyme can decompose almost all the naturally occurring polysaccharides, and therefore a power generation system using as a fuel a material containing a large amount of polysaccharides, for example, garbage can be achieved.

In the fuel cell using α-glucosidase as the decomposing enzyme and using glucose dehydrogenase as the oxidase, maltose decomposable into glucose by α-glucosidase can be used as a fuel.

In the fuel cell using sucrase as the decomposing enzyme and using glucose dehydrogenase as the oxidase, sucrose decomposable into glucose and fructose by sucrase can be used as a fuel. Sucrase is, more specifically, at least one member selected from α-glucosidase (EC 3.2.1.20), sucrose-α-glucosidase (EC 3.2.1.48), and β-fructofuranosidase (EC 3.2.1.26).

In the fuel cell using β-galactosidase as the decomposing enzyme and using glucose dehydrogenase as the oxidase, lactose decomposable into glucose and galactose by β-galactosidase can be used as a fuel.

For efficiently capturing the enzyme reaction phenomenon occurring near the negative electrode as an electric signal, it is preferred that the coenzyme oxidase, coenzyme, and electron mediator are immobilized on the negative electrode using an immobilizer. It is preferred that the oxidase is also immobilized on the negative electrode. Further, the decomposing enzyme for decomposing a polysaccharide may be immobilized on the negative electrode, and the polysaccharide finally used as a fuel may also be immobilized on the negative electrode.

In the fuel cell using starch as a fuel, a gelatinized solid fuel obtained by gelatinizing starch can be used. In this case, there can be employed a method in which gelatinized starch is brought into contact with the negative electrode having immobilized thereon an enzyme and others, or a method in which gelatinized starch is immobilized on the negative electrode, together with an enzyme and others. When using such an electrode, the starch concentration on the surface of the negative electrode can be kept high, as compared to that achieved when using starch in the form of a solution. Therefore, the decomposition reaction by the enzyme is faster and hence the output is improved, and further the solid fuel is easier to handle than a solution fuel, and can simplify the fuel supplying system, and, in addition, the fuel cell can be moved upside down and hence is very advantageously used in mobile devices.

The fuel cell of the first invention can be used in any devices which need electric power and have any sizes, and can be used in, for example, electronic devices, movable bodies, power devices, construction machines, machine tools, power generation systems, and cogeneration systems, and the application of the fuel cell determines the output, size, or form of the fuel cell or the type of the fuel.

The electronic device of the second invention may be basically any electronic device, and involves both an electronic device of a portable type and an electronic device of a fixed type, and, as specific examples, there can be mentioned cellular phones, mobile devices, robots, personal computers, game machines, devices mounted on car, household appliances, and industrial products.

The movable body of the third invention may be basically any movable body, and specific examples include automobiles, two-wheeled vehicles, aircrafts, rockets, and spacecrafts.

The power generation system of the fourth invention may be basically any power generation system and may be on either a large scale or a small scale, and, as a fuel, a polysaccharide, garbage comprising polysaccharides, or the like can be used.

The cogeneration system of the fifth invention may be basically any cogeneration system and may be on either a large scale or a small scale, and, as a fuel, a polysaccharide, garbage comprising polysaccharides, or the like can be used.

In the present invention having the above-mentioned construction, a polysaccharide contained in the fuel is decomposed by an enzyme into monosaccharides, and electrical energy can be efficiently extracted upon oxidizing the monosaccharides by an enzyme.

In the present invention, an enzyme is used as a catalyst and a material comprising a polysaccharide is used as a fuel, and thus a fuel cell capable of generating electric power with high efficiency using a polysaccharide as a fuel can be obtained. The fuel cell makes it possible to directly extract electrical energy from, for example, garbage containing a large amount of polysaccharides, thus enabling effective utilization of garbage. Further, the fuel cell does not require limited fossil fuel, and contributes to the realization of resource circulation society. In addition, a polysaccharide which is safe when it is eaten can be used as a fuel, and therefore a fuel cell advantageously used as a mobile product can be obtained. Furthermore, for example, when using gelatinized starch as a fuel, the fuel is easier to handle than a solution fuel, and can simplify the fuel supplying system, thus obtaining a fuel cell advantageously used as a mobile product. The use of this excellent fuel cell can realize a high-performance electronic device, movable body, power generation system, or cogeneration system.

Additional features and advantages of the present invention are described in, and will be apparent from, the following Detailed Description and the Figures.

DETAILED DESCRIPTION

Hereinbelow, an embodiment of the present invention will be described with reference to the accompanying drawings.

Figure 1:
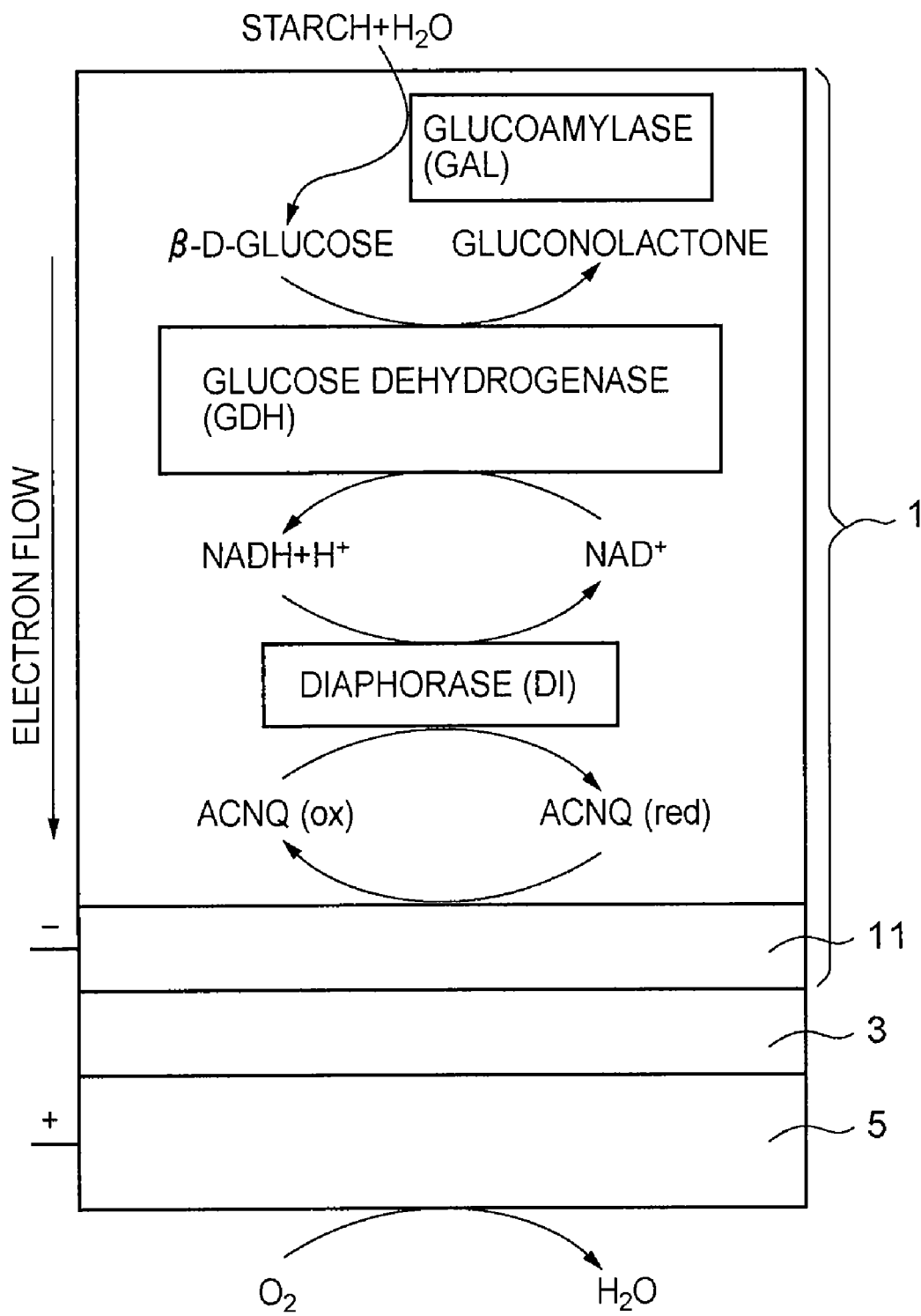
FIG. 1 is a schematic diagram showing the construction of a fuel cell according to one embodiment of the present invention.

FIG. 1 diagrammatically shows a fuel cell according to one embodiment of the present invention. As shown in FIG. 1, the fuel cell comprises a fuel electrode (negative electrode) 1 which decomposes a polysaccharide supplied as a fuel using an enzyme to get electrons and generate protons ($H^+$), an electrolyte layer 3 which conducts only protons, and an air electrode (positive electrode) 5 which is separated from the fuel electrode 1 by the electrolyte layer 3, and which forms water from protons transported from the fuel electrode 1 through the electrolyte layer 3, electrons fed from the fuel electrode 1 through an external circuit, and oxygen in air.

The fuel electrode 1 comprises an electrode 11 comprised of, e.g., carbon having immobilized thereon, by an immobilizer (e.g., a polymer), an enzyme responsible for decomposing a polysaccharide into monosaccharides, an enzyme responsible for decomposing the monosaccharide formed, a coenzyme (e.g., $NAD^+$ or $NADP^+$) which forms a reductant due to the oxidation reaction in the monosaccharide decomposition process, a coenzyme oxidase (e.g., diaphorase) for oxidizing the reductant (e.g., NADH or NADPH) of the coenzyme, and an electron mediator (e.g., 2-amino-3-carboxy-1,4-naphthoquinone; ACNQ, or vitamin K3) for receiving electrons generated due to the oxidation of the coenzyme from the coenzyme oxidase and delivering the electrons to the electrode 11.

The polysaccharide usable as a fuel comprises two or more monosaccharides bonded together. Examples of the polysaccharides include disaccharides, such as maltose, sucrose, and lactose, starch comprising amylose having a linear molecule and amylopectin having a branched molecule, high-molecular glycogen having an amylopectin-like branched molecule, cellulose having a linear molecule, and saccharides as intermediates thereof.

As an enzyme responsible for decomposing a polysaccharide, a decomposing enzyme capable of cutting a glycoside linkage by hydrolysis or the like is used. When the polysaccharide is starch, examples of the decomposing enzymes include hydrolases, such as glucoamylase (EC 3.2.1.3), α-amylase (EC 3.2.1.1), and β-amylase (EC 3.2.1.2). Among these, glucoamylase (GAL) decomposes starch into glucose. EC indicates an enzyme number.

Other polysaccharides can be decomposed by, for example, the following decomposing enzymes.

<Glycogen>
  Glucoamylase (EC 3.2.1.3)
  α-Amylase (EC 3.2.1.1)
<Dextrin>
  Glucoamylase (EC 3.2.1.3)
<Cellulose>
  Cellulase (EC 3.2.1.4)
  Exocellobiohydrase (EC 3.2.1.91)
  β-Glucosidase (EC 3.2.1.21)

Here, enzymes capable of hydrolyzing cellulose are collectively referred to as "cellulase". As examples of cellulases, there can be mentioned the above three types of enzymes, and cellulose can be decomposed into glucose in the presence of at least one member selected from the three enzymes.

<Maltose>
  α-Glucosidase (EC 3.2.1.20)

This enzyme is also called maltase, but it acts on sucrose. Maltose can be decomposed also by glucoamylase.

<Sucrose>
  α-Glucosidase (EC 3.2.1.20)
  Sucrose-α-glucosidase (EC 3.2.1.48)
  β-Fructofuranosidase (EC 3.2.1.26)

Here, enzymes capable of hydrolyzing sucrose are collectively referred to as "sucrase". As examples of sucrases, there can be mentioned the above three types of enzymes. Glucose can be formed from sucrose in the presence of at least one member selected from the three enzymes.

<Lactose>
  β-Galactosidase (EC 3.2.1.23)
<1,3-β-Glucan>
  Glucanendo-1,3-β-D-glucosidase (EC 3.2.1.39)
<α,α-Trehalose>
  α,α-Trehalase (EC 3.2.1.28)
  α,α-Trehalose phosphorylase (EC 2.4.1.64)
<Stachyose>
  α-Galactosidase (EC 3.2.1.22)
  α-Glucosidase (EC 3.2.1.20)
<Glucosides>
  β-Glucosidase (EC 3.2.1.21)

Figure 2:
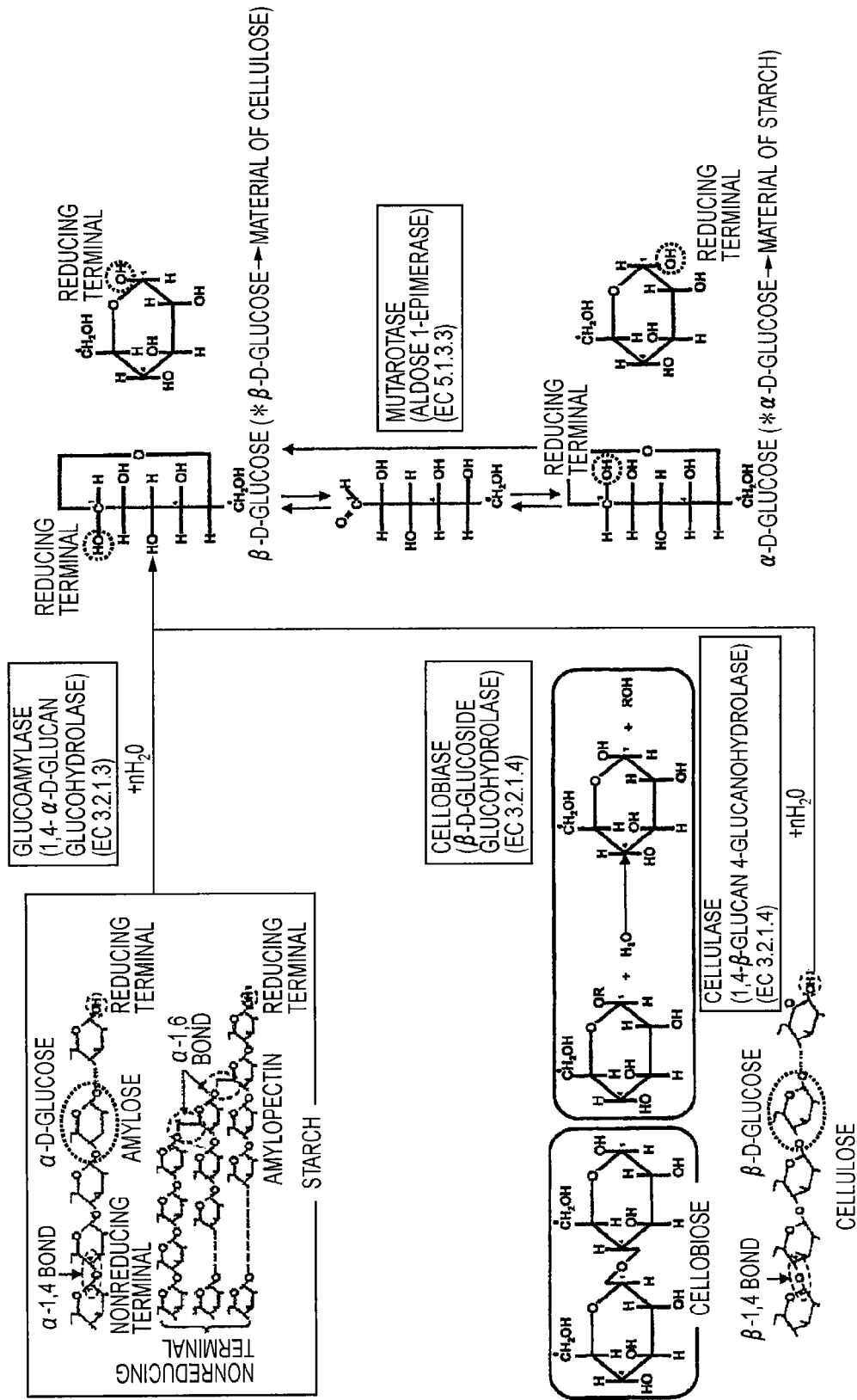
FIG. 2 is a schematic diagram illustrating the decomposition of starch and cellulose into glucose by an enzyme.

FIG. 2 shows an example of the decomposition of starch and cellulose into glucose by an enzyme.

The enzyme responsible for decomposing a monosaccharide includes an oxidase that participates in the redox reaction in the decomposition process. When the polysaccharide is starch, glycogen, cellulose, or maltose, the monosaccharide formed by hydrolysis of the polysaccharide is glucose, and, when the polysaccharide is sucrose or lactose, glucose constitutes half of the monosaccharide formed. As an example of an enzyme responsible for decomposing glucose, there can be mentioned glucose dehydrogenase (GDH). The use of this oxidase can oxidize β-D-glucose to D-glucono-δ-lactone.

Further, the resultant D-glucono-δ-lactone can be decomposed into 2-keto-6-phospho-D-gluconate in the presence of two enzymes, i.e., gluconokinase and phosphogluconate dehydrogenase (PhGDH). Specifically, D-glucono-δ-lactone is hydrolyzed into D-gluconate, and D-gluconate is phosphorylated by hydrolyzing adenosine triphosphate (ATP) in the presence of gluconokinase into adenosine diphosphate (ADP) and phosphoric acid, thus forming 6-phospho-D-gluconate. The resultant 6-phospho-D-gluconate is oxidized to 2-keto-6-phospho-D-gluconate due to the action of oxidase PhGDH.

In addition to the above decomposition process, glucose can be decomposed into $CO_2$ utilizing carbohydrate metabolism. The decomposition process utilizing carbohydrate metabolism is roughly classified into decomposition of glucose and formation of pyruvic acid through a glycolytic pathway and a TCA cycle, and these are widely known reaction systems.

The oxidation reaction in the monosaccharide decomposition process accompanies a reduction reaction of a coenzyme. The coenzyme is determined almost always depending on the enzyme used, and, when the enzyme is GDH, $NAD^+$ is used as a coenzyme. Specifically, when GDH causes β-D-glucose to be oxidized to D-glucono-δ-lactone, $NAD^+$ is reduced to NADH to generate $H^+$.

The resultant NADH is immediately oxidized to $NAD^+$ in the presence of diaphorase (DI) to form two electrons and two protons $H^+$. In other words, in the oxidation reaction on the first stage, two electrons and two protons $H^+$ are formed per one molecule of glucose. In the oxidation reaction on the second stage, four electrons and four protons $H^+$ in total are formed.

The electrons generated in the above process are delivered from diaphorase to the electrode 11 through an electron mediator, and the protons H⁺ are transported to the air electrode 5 through the electrolyte layer 3.

The electron mediator delivers electrons to the electrode, and the voltage of the fuel cell depends on the oxidation-reduction potential of the electron mediator. In other words, for obtaining a higher voltage, an electron mediator having a more negative potential on the fuel electrode 1 side is preferably selected, but the reaction affinity of the electron mediator with an enzyme, the electron exchange rate for the electrode 11, the structure stability of the electron mediator to an inhibition factor (such as light or oxygen), and the like must be taken into consideration. From this point of view, as an electron mediator for the fuel electrode 1, for example, ACNQ or vitamin K3 is preferred. Alternatively, a compound having, e.g., a quinone skeleton, a metal complex of Os, Ru, Fe, or Co, a viologen compound, such as benzyl viologen, a compound having a nicotinamide structure, a compound having a riboflavin structure, or a compound having a nucleotide-phosphate structure can be used as an electron mediator.

For achieving an efficient and steady electrode reaction, it is preferred that the enzyme, coenzyme, and electron mediator are maintained at pH optimum for the enzyme, for example, pH about 7, using a buffer, such as a Tris buffer or a phosphate buffer. Further, too large or too small ion strength (I.S.) adversely affects the enzyme activity, and, from the viewpoint of achieving excellent electrochemical response, it is preferred that the ion strength is an appropriate value, for example, about 0.3. The enzymes used individually have the optimum pH and the optimum ion strength, and hence the pH and ion strength are not limited to the above values.

The enzyme, coenzyme, and electron mediator may be used in the form of a solution in a buffer, but, for efficiently capturing the enzyme reaction phenomenon occurring near the electrode as an electric signal, it is preferred that at least the coenzyme oxidase and the electron mediator are immobilized on the electrode 11 using an immobilizer. When the enzyme for decomposing a fuel and the coenzyme are further immobilized on the electrode 11, the enzyme reaction system at the fuel electrode 1 can be stabilized. As the immobilizer, for example, glutaraldehyde (GA) and poly-L-lysine (PLL) can be used in combination. They may be used individually, or other polymers may be used. By using an immobilizer comprising a combination of glutaraldehyde and poly-L-lysine, the enzyme immobilizing abilities of the individual components can be fully utilized, so that the immobilizer exhibits collectively excellent enzyme immobilizing ability. In this case, an optimum ratio of glutaraldehyde to poly-L-lysine varies depending on the enzyme to be immobilized and a substrate of the enzyme, but, generally, the ratio may be arbitrary. Specifically, a ratio of an aqueous glutaraldehyde solution (0.125%) to an aqueous poly-L-lysine solution (1%) is 1:1, 1:2, or 2:1.

FIG. 1 shows an example in which the polysaccharide is starch, the enzyme responsible for decomposing the polysaccharide into monosaccharides is glucoamylase (GAL) which decomposes starch into glucose, the enzyme responsible for decomposing the monosaccharide formed (β-D-glucose) is glucose dehydrogenase (GDH), the coenzyme which forms a reductant due to the oxidation reaction in the monosaccharide decomposition process is NAD⁺, the coenzyme oxidase for oxidizing NADH which is the reductant of the coenzyme is diaphorase (DI), and the electron mediator for receiving from the coenzyme oxidase electrons generated due to the oxidation of the coenzyme and delivering the electrons to the electrode 11 is ACNQ.

The electrolyte layer 3 is comprised of a material which is a proton-conductive membrane for transporting protons H⁺ generated at the fuel electrode 1 to the air electrode 5 and which has no electron conduction properties and can transport protons H⁺. Examples of the electrolyte layers 3 include layers comprised of a perfluorocarbonsulfonic acid (PFS) resin membrane, a trifluorostyrene derivative copolymer membrane, a polybenzimidazole membrane impregnated with phosphoric acid, an aromatic polyether ketone sulfonic acid membrane, PSSA-PVA (polystyrenesulfonic acid-polyvinyl alcohol copolymer), or PSSA-EVOH (polystyrenesulfonic acid-ethylenevinyl alcohol copolymer). Of these, preferred is a layer comprised of an ion-exchange resin having a fluorine-containing carbon sulfonic acid group, and, specifically, Nafion (trade name; manufactured and sold by Du Pont Co., U.S.A.) is used.

The air electrode 5 is comprised of carbon powder having a catalyst carried thereon or catalyst particles which are not supported on carbon. In the catalyst, for example, fine particles of platinum (Pt), or fine particles of an alloy of a transition metal, such as iron (Fe), nickel (Ni), cobalt (Co), or ruthenium (Ru), and platinum or an oxide are used. The air electrode 5 has a structure such that, for example, a catalyst or a catalyst layer comprised of carbon powder comprising a catalyst and a gas diffusion layer comprised of a porous carbon material are stacked in this order from the electrolyte layer 3 side. The structure of the air electrode 5 is not limited to this, and an oxidoreductase can be used as a catalyst. In this case, the oxidoreductase and an electron mediator for delivering electrons to the electrode are used in combination.

At the air electrode 5, protons H⁺ from the electrolyte layer 3 and electrons from the fuel electrode 1 reduce oxygen in air in the presence of a catalyst to form water.

In the fuel cell having the above-described construction, when a polysaccharide, such as starch, is supplied to the fuel electrode 1, the polysaccharide is hydrolyzed by an enzyme into monosaccharides, such as glucose, and further the monosaccharide is decomposed by a decomposing enzyme comprising an oxidase. The oxidase participates in the monosaccharide decomposition process to form both electrons and protons H⁺ on the fuel electrode 1 side, making it possible to generate an electric current between the fuel electrode 1 and the air electrode 5.

In the fuel cell, the type of the decomposable polysaccharide is determined depending on the type of the decomposing enzyme held or immobilized on the fuel electrode 1. When a mixture containing a plurality of polysaccharides is used as a fuel, enzymes for respectively decomposing the polysaccharides are held or immobilized on the fuel electrode 1, thus improving the fuel efficiency. In addition, garbage or the like can be used as a fuel to generate electric power, enabling effective utilization of garbage and others.

Figure 3:
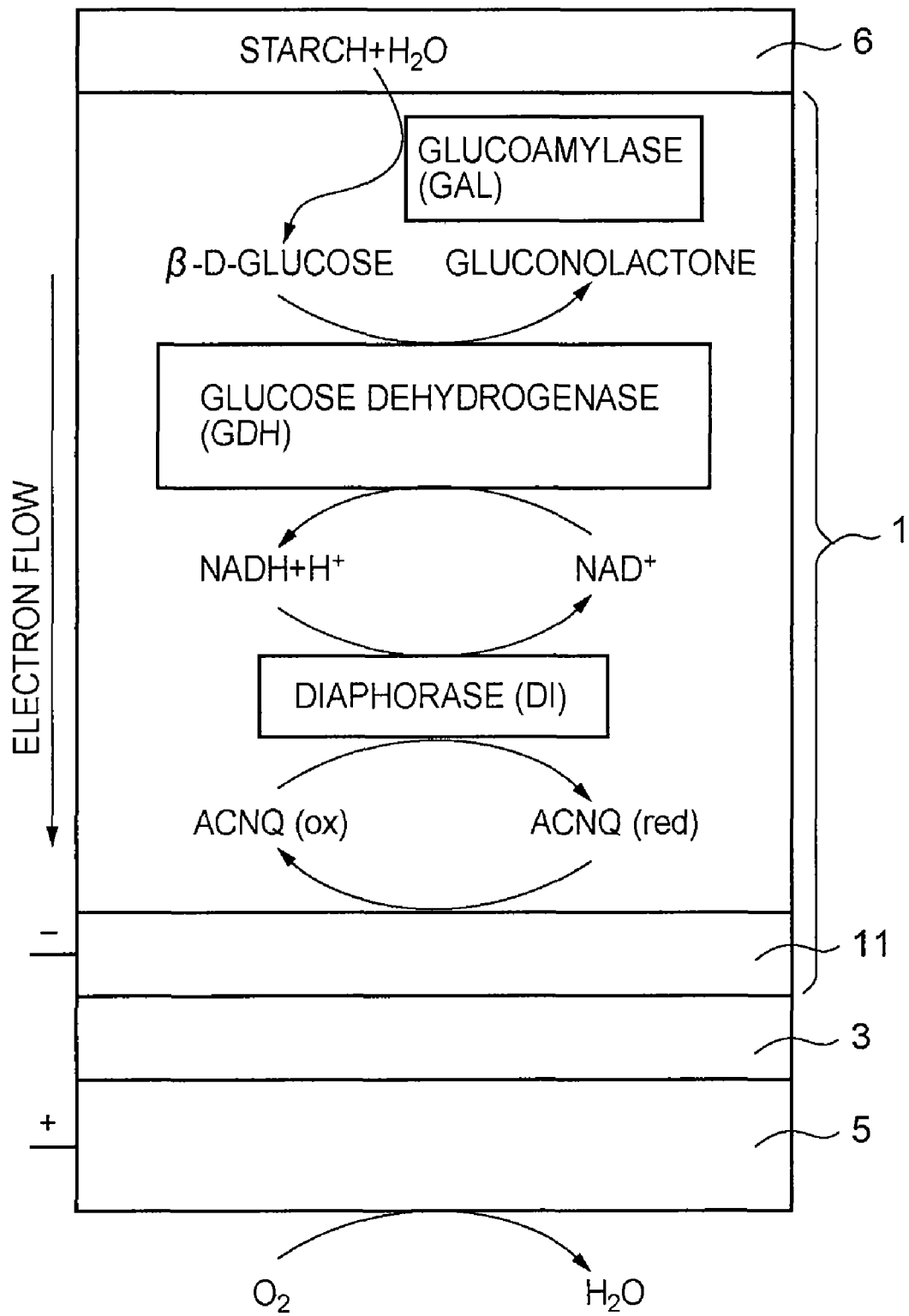
FIG. 3 is a schematic diagram showing the construction of a fuel cell according to one embodiment of the present invention using starch glue.

Furthermore, the above fuel cell can use as a fuel a polysaccharide having a high energy density, which is safe when it is eaten, and further can work at room temperature, and therefore is advantageously used in mobile products. With respect to the energy density obtained when using a polysaccharide as a fuel, taking cooked white rice as an example, the energy of starch contained in about 100 g of cooked rice (corresponding to one rice bowl and about 160 kcal) corresponds to the energy of 64 AA-size alkali dry cells (about 3 Wh per cell), which is a high fuel energy density equal to or more than that obtained from a glucose solution. Polysaccharide as a fuel can be used in the form of an aqueous solution, but there can be employed a method in which the polysaccharide is gelatinized like starch glue and brought into contact with the fuel electrode 1 or a method in which the polysaccharide is disposed within the fuel electrode 1, and thus a solidified fuel can be used in the fuel cell, which is further advantageous to mobile products. Glucose has a problem in that glucose having a small diffusion coefficient, as compared to methanol or ethanol, is disadvantageous to a fuel-molecule diffusion controlled reaction which proceeds when the glucose is used as a fuel in the form of a solution. However, when a method in which starch is gelatinized and brought into contact with the fuel electrode 1 or a method in which starch is disposed within the fuel electrode 1 is employed, the starch concentration on the surface of the fuel electrode 1 or in the fuel electrode 1, namely, the glucose concentration can be kept high, so that the output is improved, as compared to that achieved when using starch in the form of a solution. In addition, a solidified fuel, such as starch glue, is easier to handle than a liquid fuel, and can simplify the fuel supplying system, and thus it is very effective when the fuel cell is applied to mobile products. FIG. 3 shows an example in which starch glue 6 as a fuel is immobilized on the fuel electrode 1.

When starch which is a polysaccharide is used as a fuel, the glucose concentration on the surface of the fuel electrode 1 or in the fuel electrode 1 can be kept high, as compared to that obtained when using glucose which is a monosaccharide as a fuel. Specifically, for example, amylose contained in starch comprises several hundred to several thousand molecules of glucose bonded together, and, when one molecule of amylose as a fuel molecule arrives at the surface of the fuel electrode 1 by diffusion, the transport speed of glucose to the surface of the fuel electrode 1 is several hundred to several thousand times that achieved when using glucose as a fuel. In other words, the use of starch as a fuel makes it possible to transport glucose to the surface of the fuel electrode 1 at a higher speed.

Figure 4A:
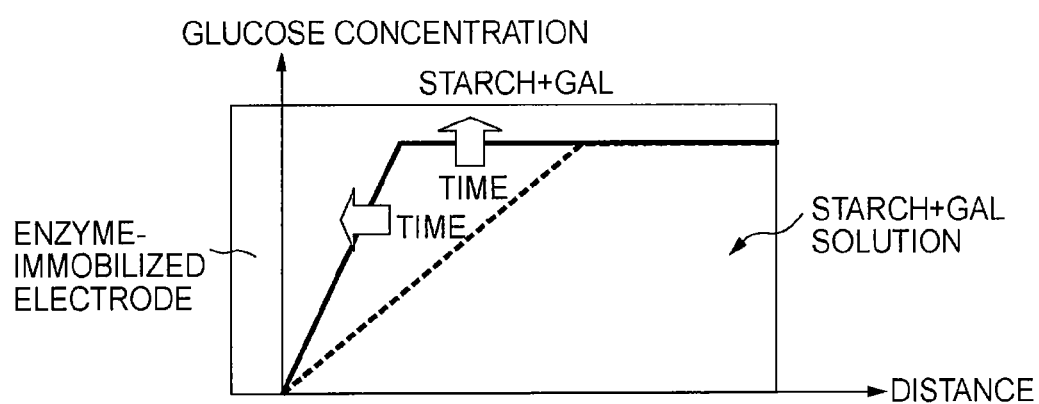
FIG. 4 are diagrams showing the glucose concentration distribution in the direction perpendicular to the surface of the fuel electrode in the fuel cell according to one embodiment of the present invention.
Figure 4B:
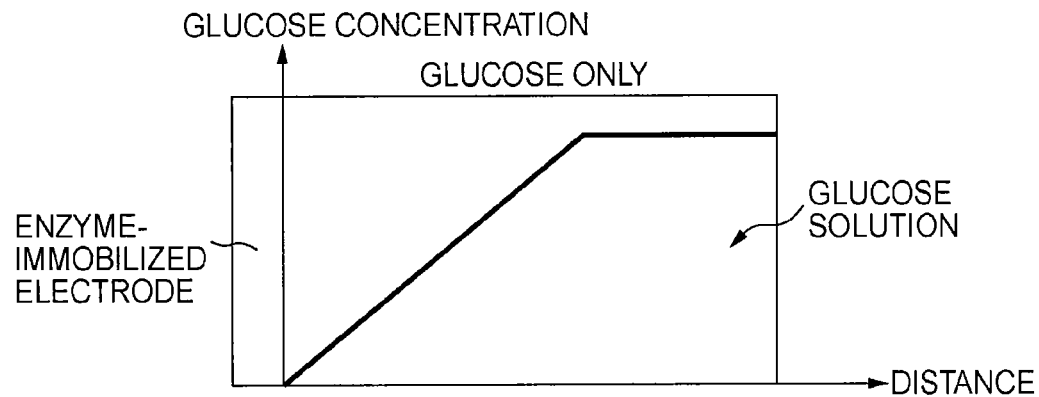

FIG. 4A shows a state such that a CA measurement (in the measurement of a change of the current with time at a constant potential, a state in which a steady current flows is a diffusion-controlled state) was conducted in a solution containing starch and glucoamylase (GAL) using an enzyme-immobilized electrode having ACNQ, diaphorase (DI), and glucose dehydrogenase (GDH) immobilized on the electrode 11 by an immobilizer and a satisfactorily long period of time had lapsed (diffusion-controlled state). Similarly, FIG. 4B shows a state such that a CA measurement was conducted in a glucose solution using the same enzyme-immobilized electrode and a satisfactorily long period of time had lapsed (diffusion-controlled state). The enzyme reaction in the enzyme-immobilized electrode is satisfactorily fast, that is, glucose which has reached the surface of the electrode by diffusion can be very rapidly decomposed to deliver electrons to the electrode. In the case of FIG. 4B, on the surface of the electrode, the consumption of glucose by the enzyme-immobilized electrode balances with the supply of glucose by diffusion from the glucose solution far away from the enzyme-immobilized electrode to exhibit a constant glucose concentration gradient. This glucose concentration gradient determines a current, and, the larger the glucose concentration gradient, the larger the current. That is, the current can be increased by increasing the glucose concentration. On the other hand, in the case of FIG. 4A, no glucose is present in the solution at the beginning of the measurement, but the solution contains glucoamylase as well as starch, and hence glucoamylase hydrolyzes starch to form glucose. In this case, on the surface of the electrode, the consumption of glucose by the enzyme-immobilized electrode balances with the supply by diffusion of glucose formed in the solution containing starch and glucoamylase and the supply of glucose formed due to glucoamylase present on the surface of the electrode, determining a current. The glucose formed on the surface of the electrode increases the glucose concentration on the surface of the electrode, as compared to that obtained when using a glucose solution (compared in terms of the ultimate glucose saturated solution). When glucoamylase and starch are further immobilized on the enzyme-immobilized electrode, that is the construction shown in FIG. 3 is employed, the above effect can be further improved.

Next, a method for supplying a fuel to the fuel cell is described. Here, the case where starch is used as a fuel is mentioned.

Figure 5A:
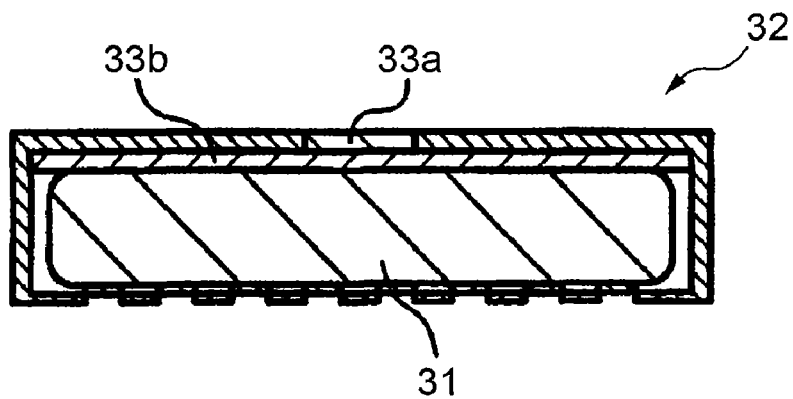
FIG. 5 are diagrammatic views showing a fuel cartridge used in the fuel cell according to one embodiment of the present invention.
Figure 5B:
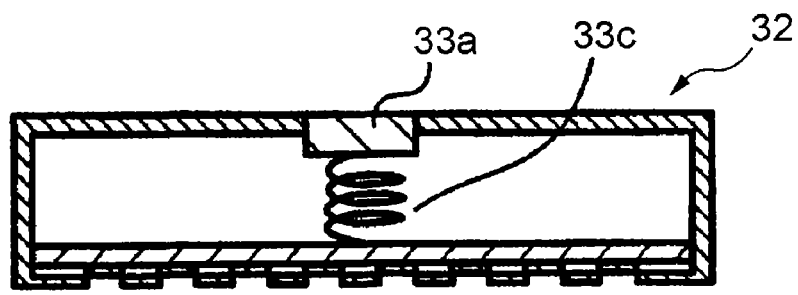

FIG. 5A shows an unused, card-shaped fuel cartridge 32 filled with a fuel 31 comprising a starch solution (amylose, amylopectin), starch glue, or the like. The fuel 31 may contain glucose, NADH, or the like, and, in such a case, the current at the beginning of the operation can be large, as compared to the current obtained when using a fuel 31 comprising only starch. FIG. 5B shows the used fuel cartridge 32 which has used all the fuel 31. In FIGS. 5A and 5B, reference numerals 33a, 33b designate fuel pushers. Reference numeral 33c designates a spring for pushing the fuel, having both ends fixed to the fuel pushers 33a, 33b. The fuel pusher 33a is fixed to the fuel cartridge 32, and the spring 33c pushes the fuel pusher 33b against the fuel 31.

Figure 6:
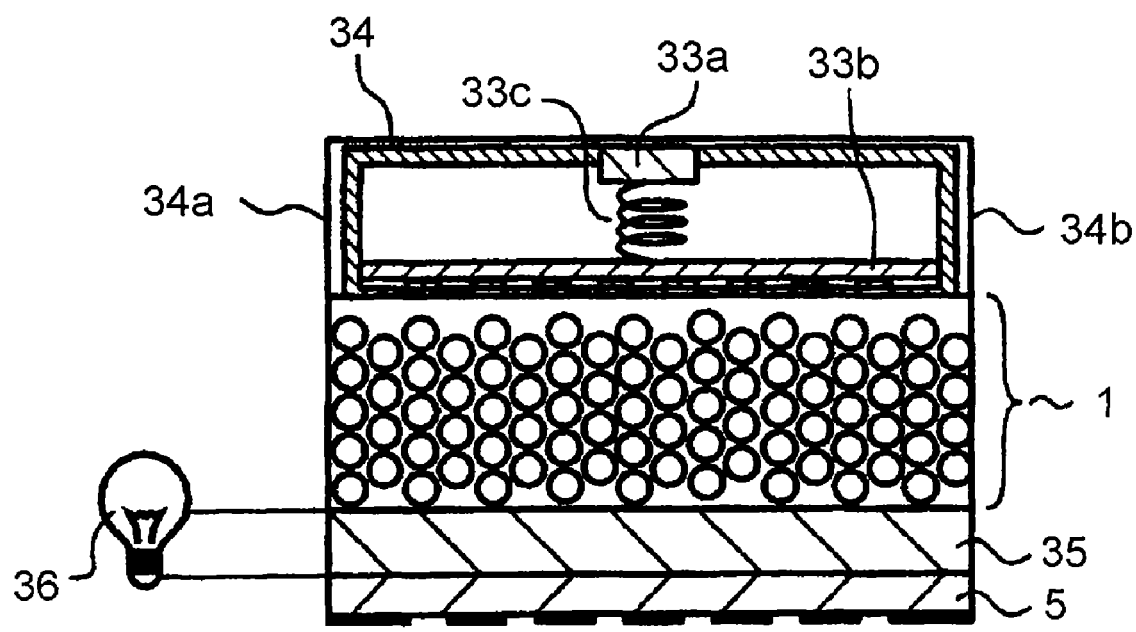
FIG. 6 is a diagrammatic view for explaining a method for supplying a fuel to the fuel cell according to one embodiment of the present invention.

FIG. 6 shows the fuel cell in which the fuel cartridge 32 has used all the fuel 31. The fuel cartridge 32 is contained in a fuel cartridge container 34. The fuel cartridge container 34 has a cartridge inlet 34a through which the fuel cartridge 32 is inserted into the fuel cartridge container and a cartridge outlet 34b through which the fuel cartridge 32 is removed from the container. The fuel cell has a construction such that an air electrode 5 comprised of an enzyme-immobilized carbon electrode having an enzyme immobilized on porous carbon and a fuel electrode 1 comprised of an enzyme-immobilized carbon electrode having an enzyme and an electron mediator immobilized by an immobilizer on porous carbon like in Example 1 are disposed so that they face each other through a separator 35 as a proton conductor (corresponding to the electrolyte layer 3). In FIG. 6, as an example of a load of an external circuit, an electric bulb 36 is connected to the air electrode 5 and the fuel electrode 1. The fuel cartridge 32 has used all the fuel 31, and therefore the electric bulb 36 is not lightening. The fuel cartridge 32 generally has a size larger than that of the air electrode 5 or fuel electrode 1.

Figure 7:
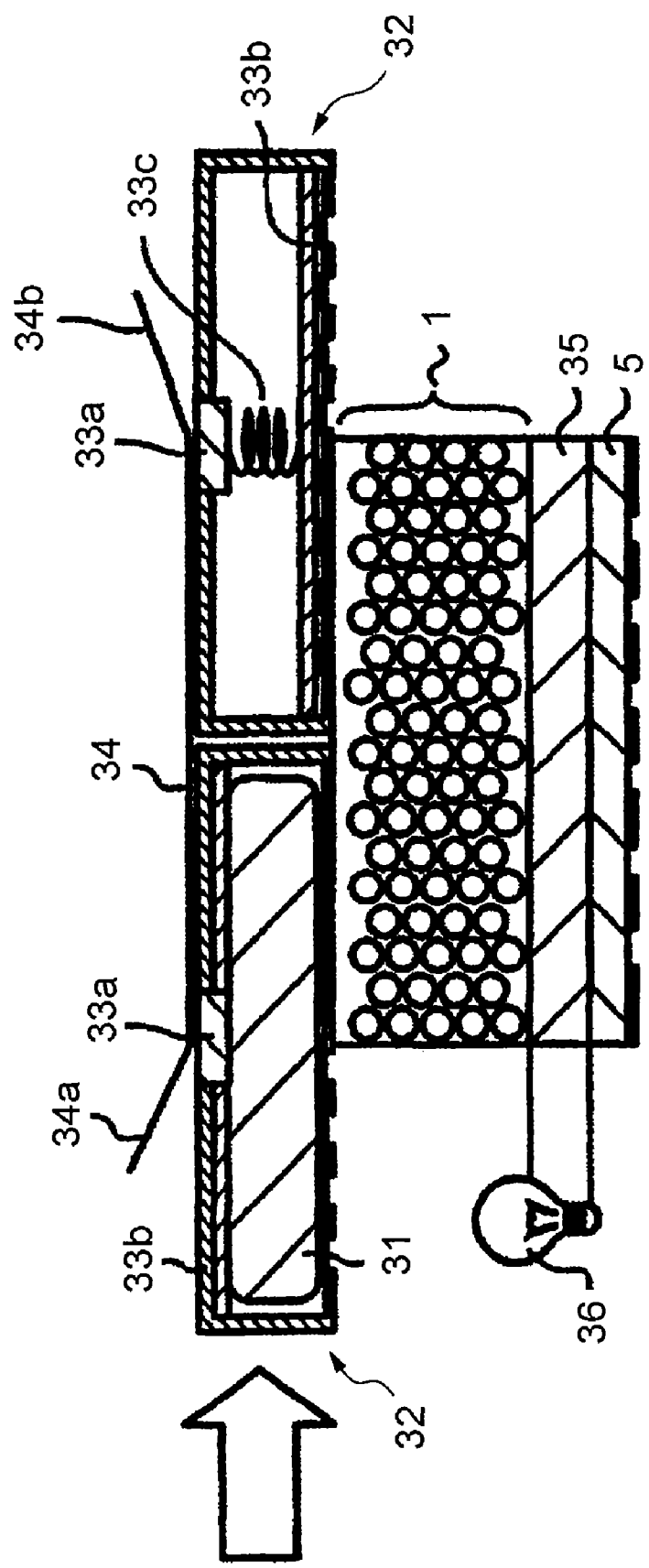
FIG. 7 is a diagrammatic view for explaining a method for supplying a fuel to the fuel cell according to one embodiment of the present invention.
Figure 8:
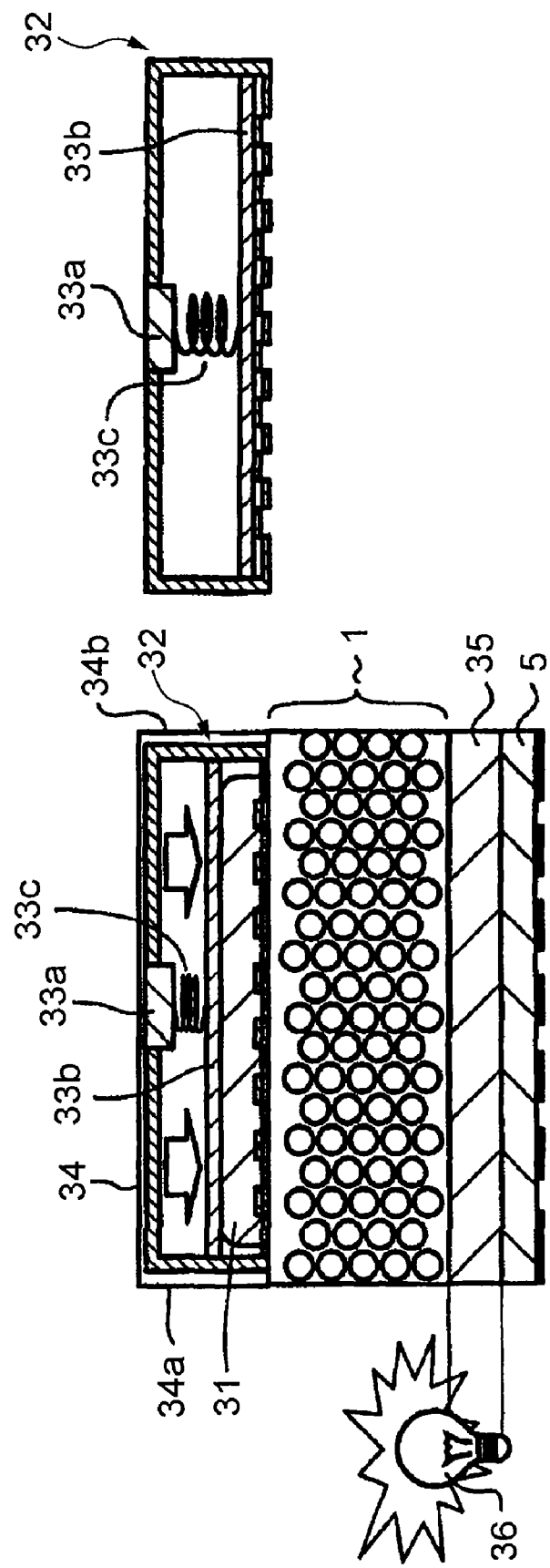
FIG. 8 is a diagrammatic view for explaining an example of the method for supplying a fuel to the fuel cell according to one embodiment of the present invention.

The used fuel cartridge 32 is changed to an unused fuel cartridge 32 as follows. As shown in FIG. 7, the cartridge inlet 34a is opened, and the unused fuel cartridge 32 is inserted into the fuel cartridge container 34 to push the used fuel cartridge 32, letting it go out of the container through the cartridge outlet 34b. At a point in time when the used fuel cartridge 32 is completely removed from the cartridge outlet 34b, the unused fuel cartridge 32 is set in a predetermined position. This state is shown in FIG. 8. As shown in FIG. 8, when the unused fuel cartridge 32 is set in the position, a feed passage for the fuel 31 is formed between the fuel cartridge 32 and the fuel electrode 1, so that the fuel 31 is supplied to the fuel electrode 1 through the feed passage. This can be easily realized in an electromechanical system. In this instance, in the fuel cartridge 32, the fuel pusher 33b pushes the fuel 31, and therefore the fuel 31 can be fed to the inside of the fuel electrode 1 comprised of an enzyme-immobilized carbon electrode having an enzyme and an electron mediator immobilized by an immobilizer on porous carbon. This is effective when, for example, liquid having a high viscosity is used as the fuel 31. When the fuel 31 can reach the inside of the fuel electrode 1 merely by diffusion, the fuel pushers 33a, 33b and spring 33c can be omitted, but, when using the fuel pushers 33a, 33b and spring 33c, the fuel 31 can be more surely supplied to the inside of the fuel electrode 1. Thus, the fuel 31 is supplied to the fuel electrode 5 to start power generation, so that the electric bulb 36 lightens.

It is preferred that $CO_2$ or $H_2O$, or both generated in the power generation are stored in a vacant space of the fuel cartridge 32 left after all the fuel 31 has been used. Specifically, $CO_2$ or $H_2O$ may be discharged from the fuel cell, but, from an environmental point of view, more specifically, discharging $CO_2$ from the fuel cell is not preferred from the viewpoint of preventing global warming, and further, discharging $H_2O$ from the fuel cell has a problem in that, when, e.g., a cellular phone having the fuel cell mounted is put in a pocket or bag, the pocket or bag may be wetted with water discharged, and therefore it is preferred to store $CO_2$ or $H_2O$, or both in the fuel cartridge 32. $CO_2$ or $H_2O$ can be efficiently stored in a vacant space of the fuel cartridge 32 left after all the fuel 31 has been used.

Amylase may be put in the portion of the fuel cartridge 32 containing the fuel 31. In this case, the concentration of glucose supplied to the surface of the fuel electrode 1 is increased, thus making it possible to obtain a large current and a large initial current.

As the fuel cartridge 32, a fuel cartridge preliminarily filled with the fuel 31 may be used, or, for emergency, the fuel cartridge 32 into which easily available cooked rice, pasta, potato, or the like, which is appropriately treated, is charged may be used. A method for charging the fuel 31 into the fuel cartridge 32 may be in which, for example, a fuel reservoir container is prepared and a fuel inlet formed in the fuel cartridge 32 is connected to the container to charge the fuel 31. In this instance, the fuel cartridge 32 may be either removed from the fuel cell or not.

With respect to the treatment of starch, starch in raw rice or potato is comprised mainly of β-starch crystallites and amylase exhibits almost no activity, but, when starch is heated, β-starch is changed to gelatinized α-starch, so that amylase exhibits an activity. For this reason, it is preferred to supply α-starch as the fuel 31 to the fuel electrode 1, but α-starch is changed to β-starch with the passage of time (aging).

The fuel 31 having moisture extremely reduced or having almost no moisture can be used. Starch can be solidified by pressing it. Glucose can be solidified by this method, but it has poor formability. In the solidified fuel 31, molecules are unlikely to diffuse, and therefore the solidified fuel cannot be used as it is. In this case, while contacting the fuel 31 and the fuel electrode 1 with each other, water may be supplied from the outside or from the inside of the fuel cartridge 32 (in which the starch solid material and water are separated from each other), so that the fuel cell starts power generation. As the water, water formed at the air electrode 5 may be utilized based on the principle similar to that of a direct methanol fuel cell (DMFC) using a 100% methanol fuel. This is a system in which the fuel electrode 1 and the air electrode 5 collectively form water in principle. The reaction in this system is represented by the following formula:

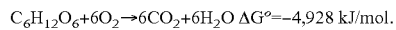

$C_6H_{12}O_6 + 6O_2 \rightarrow 6CO_2 + 6H_2O$ $\Delta G° = -4,928$ kJ/mol.

Next, a method for supplying a fuel to the fuel cell used as a throwaway primary battery, such as a dry cell, is described.

Figure 9:
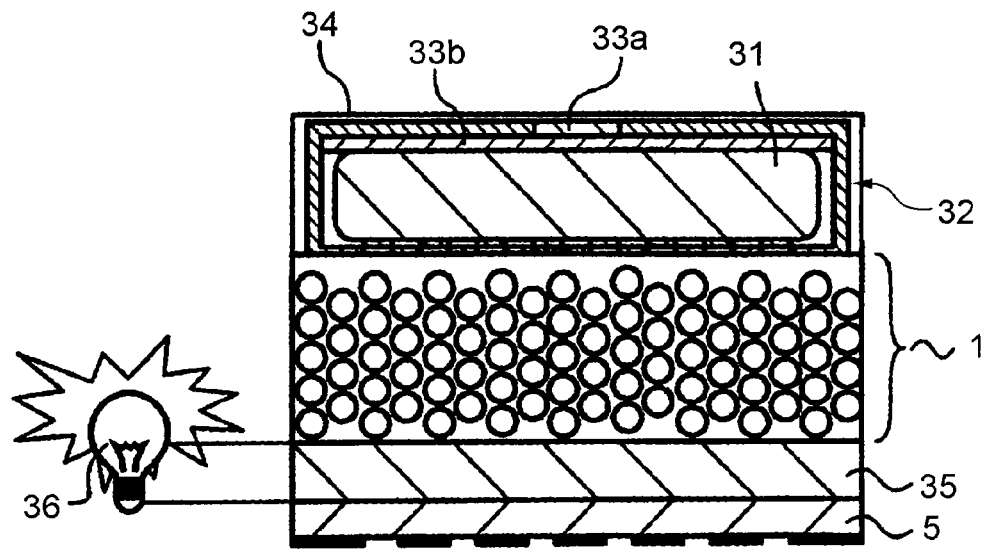
FIG. 9 is a diagrammatic view for explaining another example of the method for supplying a fuel to the fuel cell according to one embodiment of the present invention.

In this case, a mechanism for removing and inserting the fuel cartridge 32 to the fuel cell is not needed, and, as shown in FIG. 9, the fuel cartridge 32 is preliminarily unified with the fuel electrode 1. In this case, the method for supplying the fuel 31 from the fuel cartridge 32 to the fuel electrode 1 is similar to the method described above.

Hereinbelow, the present invention will be described with reference to the following Examples.

EXAMPLE 1

Onto a glassy carbon (GC) electrode (BAS, φ=3.0 mm) were applied dropwise 3 μl of a phosphate buffer solution (83 μM) of diaphorase (DI)(UNITIKA LTD., from *Bacillus stearothermophilus*), 6 μl of a phosphate buffer solution (60 μM) of glucose dehydrogenase (GDH) (TOYOBO LTD.), 3 μl of a phosphate buffer solution (1.4 mM) of glucoamylase (GAL) (Oriental Yeast Co., Ltd.), 3 μl of an aqueous solution (1%) of poly-L-lysine (PLL), 2 μl of a phosphate buffer solution (0.4 M) of NADH, 2 μl of an ethanol solution (28 mM) of ACNQ, and 3 μl of an aqueous solution (0.125%) of glutaraldehyde (GA), and they were mixed with each other and air-dried at room temperature, followed by washing with distilled water, preparing a GAL/GDH/NADH/DI/ACNQ-immobilized electrode (see FIG. 1).

The thus prepared immobilized electrode was used as a working electrode, an Ag/AgCl electrode was used as a reference electrode, a Pt electrode was used as a counter electrode, an electrolytic cell made of polytetrafluoroethylene having a capacity of 1 ml was used as a reaction bath, and 1 ml of a 0.1 M phosphate buffer solution (pH: 7; I.S.=0.3) containing water-soluble starch in a concentration of 1% was used as a reaction solution, and they were subjected to deoxygenation using Ar gas, and then an electrochemical measurement was conducted at room temperature (25° C.).

EXAMPLE 2

An electrochemical measurement was conducted in substantially the same manner as in Example 1 except that 5 mg of a material obtained by gelatinizing a 50% phosphate buffer solution of starch at 70° C. was applied to the GAL/GDH/NADH/DI/ACNQ-immobilized electrode prepared in Example 1, and that the reaction solution was changed to 1 ml of a 0.1 M phosphate buffer solution (pH 7; I.S.=0.3).

COMPARATIVE EXAMPLE 1

An electrochemical measurement was conducted in substantially the same manner as in Example 1 except that glucoamylase (GAL) was omitted in the process of preparing the immobilized electrode in Example 1 to prepare a GDH/NADH/DI/ACNQ-immobilized electrode.

Figure 10:
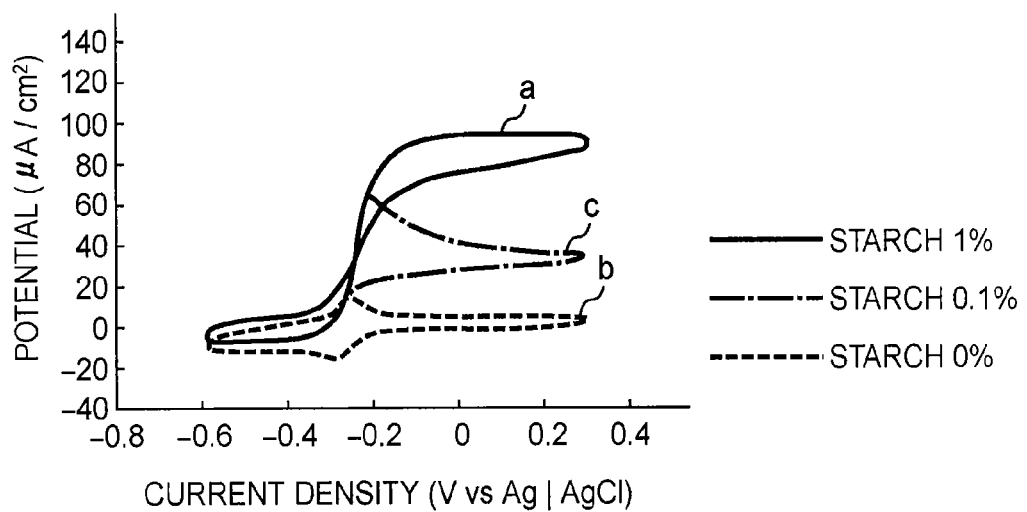
FIG. 10 is a diagram showing the results of the CV measurement in Example 1 of the present invention.

With respect to Example 1, potential scan was performed in accordance with a potential sweep method (CV) at a scanning speed of 20 mV/sec. The result of the CV measurement is shown in FIG. 10 (solid line a in the graph). In FIG. 10, for reference, the result of the CV measurement in the case where a 0.1 M phosphate buffer solution containing no starch was used as a reaction solution is shown by a broken line b, and the result of the CV measurement in the case where a 0.1 M phosphate buffer solution containing starch in a concentration of 0.1% was used as a reaction solution is shown by a dot-dash line c. In the measurement in the case where a solution containing starch in a concentration of 0.5% was used, a result substantially the same as the solid line a was obtained.

As seen from FIG. 10, when the reaction solution contains starch, an oxidation current is observed, which indicates that starch in the membrane immobilized on the electrode is decomposed by GAL into glucose and the glucose is decomposed by GDH, and the reactions successively proceed, so that the electrode receives electrons.

Figure 11:
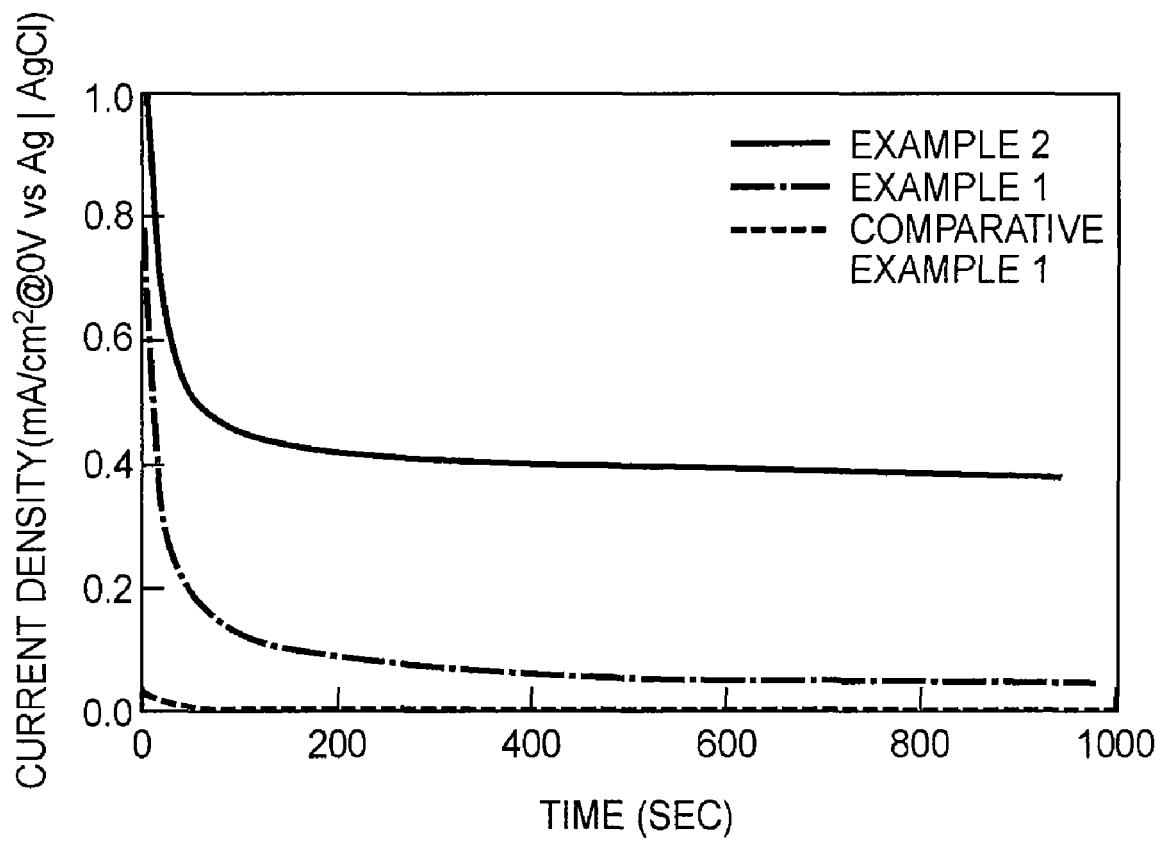
FIG. 11 is a diagram showing a change of the current density with time at a constant potential 0 V of the working electrode relative to the reference electrode in the electrochemical measurements in Examples 1 and 2 of the present invention.

In each of the electrochemical measurements in Examples 1 and 2 and Comparative Example 1, a change of the current density with time at a constant potential 0 V of the working electrode relative to the reference electrode is shown in FIG. 11. Further, steady currents obtained after a satisfactorily long period of time has lapsed in FIG. 11 are shown in Table 1.

TABLE 1

| | Steady current ($\mu$A/cm$^2$ @0 V vs Ag|AgCl) |
|---|---|
| Example 1 | 58 |
| Example 2 | 395 |
| Comparative Example 1 | 2 |

As can be seen from Table 1, in Examples 1 and 2 in which glucoamylase which is an enzyme decomposing starch was present, a current could be generated using starch as a fuel. Especially in Example 2 in which starch was gelatinized and immobilized on the surface of the electrode, there could be obtained a current larger than that obtained in Example 1 in which starch in the form of a solution was in contact with the electrode. The reason for this is that the starch concentration, namely, glucose concentration on the surface of the electrode can be kept high as mentioned above, making it possible to promote the decomposition reaction of the fuel.

Glucose has a problem in that glucose having a small diffusion coefficient, as compared to methanol or ethanol, is disadvantageous to a diffusion controlled reaction which is likely to proceed when the glucose is used as a fuel in the form of a solution, but, as apparent from the above results, the problem can be solved by using starch as a fuel or immobilizing gelatinized starch on the surface of the electrode. Further, the use of a gelatinized solid fuel makes easy handling of the fuel and can simplify the fuel supplying system, and hence the resultant fuel cell is very useful as a fuel cell mounted on mobile devices, such as cellular phones.

EXAMPLE 3

Figure 12:
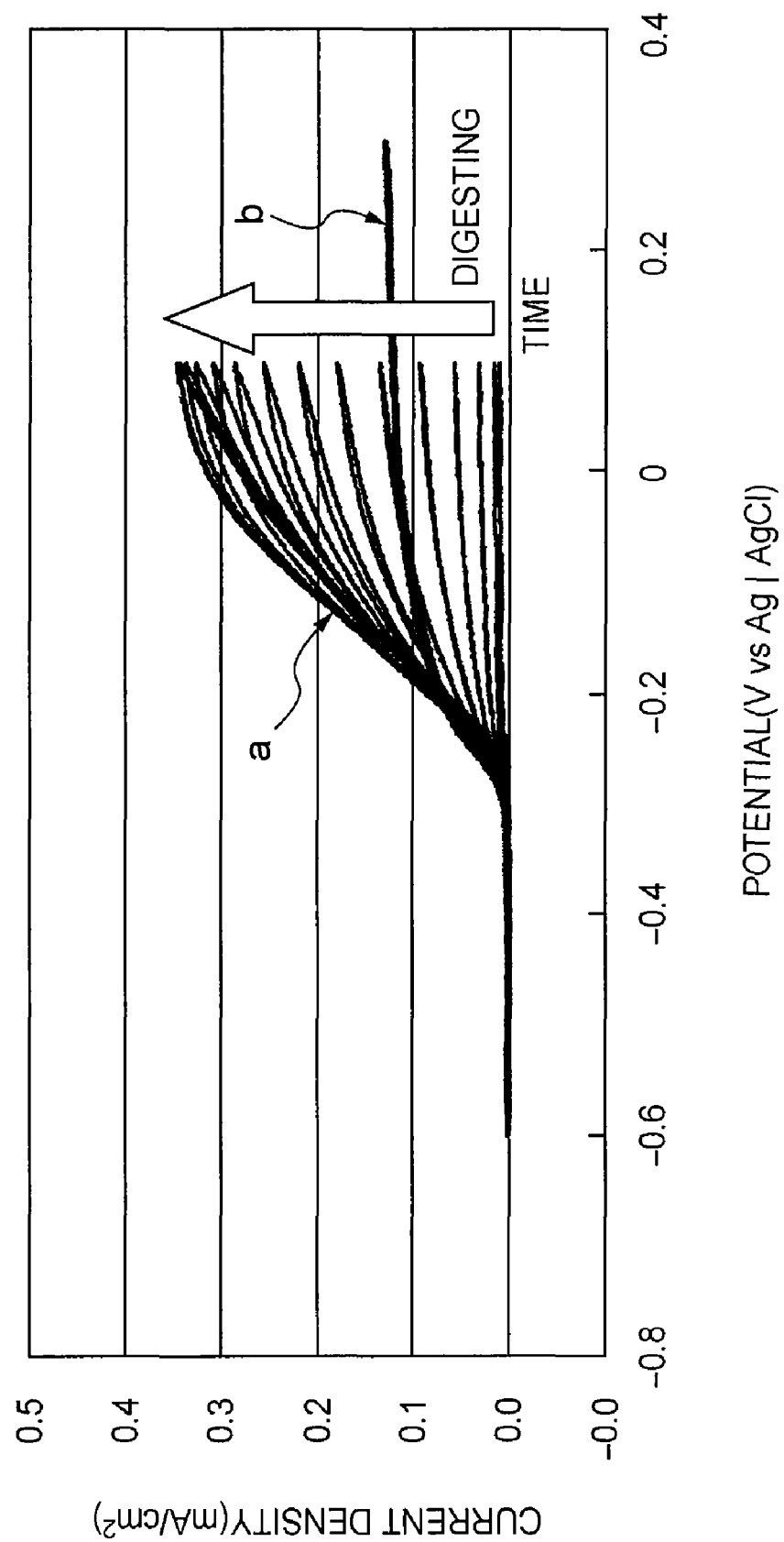
FIG. 12 is a diagram showing the results of the CV measurement in Example 3 of the present invention.

With respect to the fuel electrode 1 having immobilized thereon starch glue 6 as a fuel and glucoamylase (GAL) as an enzyme decomposing starch into glucose, a CV measurement was conducted under the same conditions as those used in Example 1. The results are shown in FIG. 12 (curved line a). In FIG. 12, for reference, the result of the CV measurement in the case where a glucose solution was used as a fuel is also shown (curved line b). As can be seen from FIG. 12, when the starch glue 6 is used as a fuel, a considerably large current can be obtained, as compared to the maximum current obtained when the glucose solution (glucose concentration: 200 mM) is used as a fuel. This result reflects the extremely high glucose concentration on the surface of the fuel electrode 1 as mentioned above. Further, the reason why the current increases with the passage of time resides in that the starch is gradually hydrolyzed by glucoamylase (GAL) and, consequently, the glucose concentration on the surface of the electrode increases with the passage of time. The curved line b has a shape unique to a diffusion controlled reaction.

EXAMPLE 4

Figure 13A:
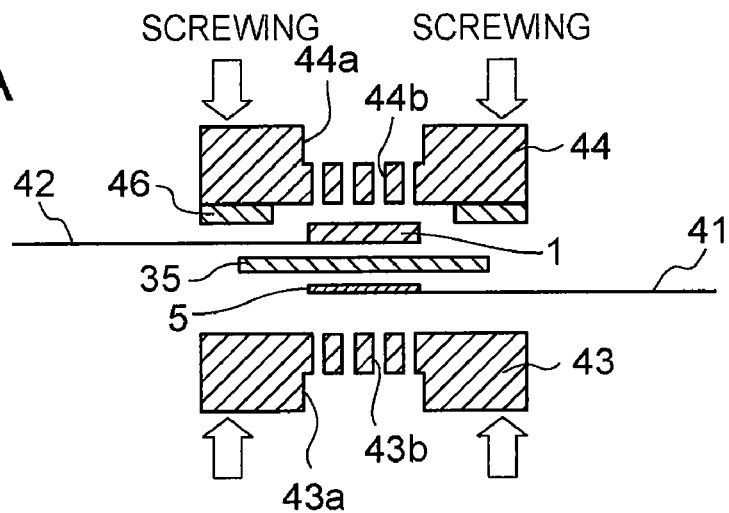
FIG. 13 are diagrammatic views of a fuel cell used in the evaluation in Example 4 of the present invention.
Figure 13B:
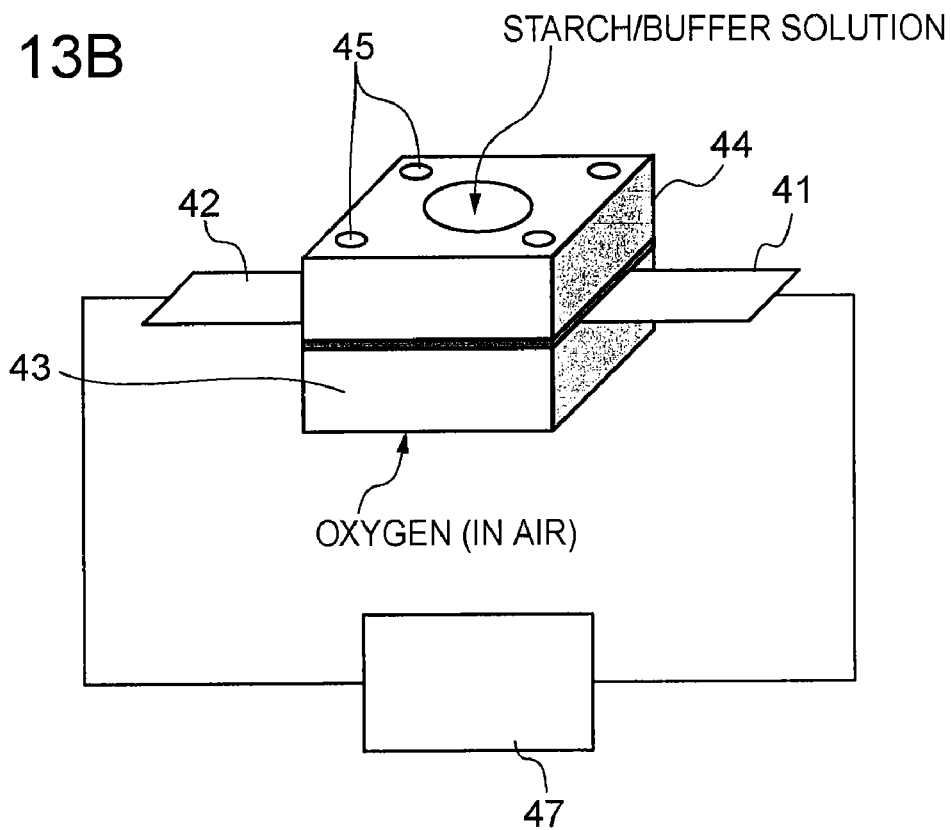

A fuel cell shown in FIGS. 13A and 13B was assembled and an evaluation was made. As shown in FIGS. 13A and 13B, the fuel cell has a construction such that an air electrode 5 comprised of an enzyme-immobilized carbon electrode having an enzyme immobilized on 0.25 cm$^2$ carbon felt and a fuel electrode 1 comprised of an enzyme-immobilized carbon electrode having an enzyme and an electron mediator immobilized by an immobilizer on 0.25 cm$^2$ carbon felt like in Example 1 are disposed so that they face each other through a separator 35 as a proton conductor. In this case, the separator 35 is comprised of a predetermined film having proton conduction properties, e.g., cellophane. Ti current collectors 41, 42 are disposed, respectively, under the air electrode 5 and on the fuel electrode 1, thus facilitating current collection. Reference numerals 43, 44 designate clamp plates. The clamp plates 43, 44 are fastened to each other with screws 45, and between them are sandwiched whole of the air electrode 5, fuel electrode 1, separator 35, and Ti current collectors 41, 42. A circular recessed portion 43a for drawing air is formed in one side (outer side) of the clamp plate 43, and a number of holes 43b are formed at the bottom of the recessed portion 43a so that they penetrate the clamp plate 43 to another side. The holes 43b serve as air feed passages to the air electrode 5. On the other hand, a circular recessed portion 44a for charging a fuel is formed in one side (outer side) of the clamp plate 44, and a number of holes 44b are formed at the bottom of the recessed portion 44a so that they penetrate the clamp plate 44 to another side. The holes 44b serve as fuel feed passages to the fuel electrode 1. A spacer 46 is provided at the periphery portion of another side of the clamp plate 44 so that the clamp plates 43, 44 fastened with the screws 45 have a predetermined space between them.

Figure 14:
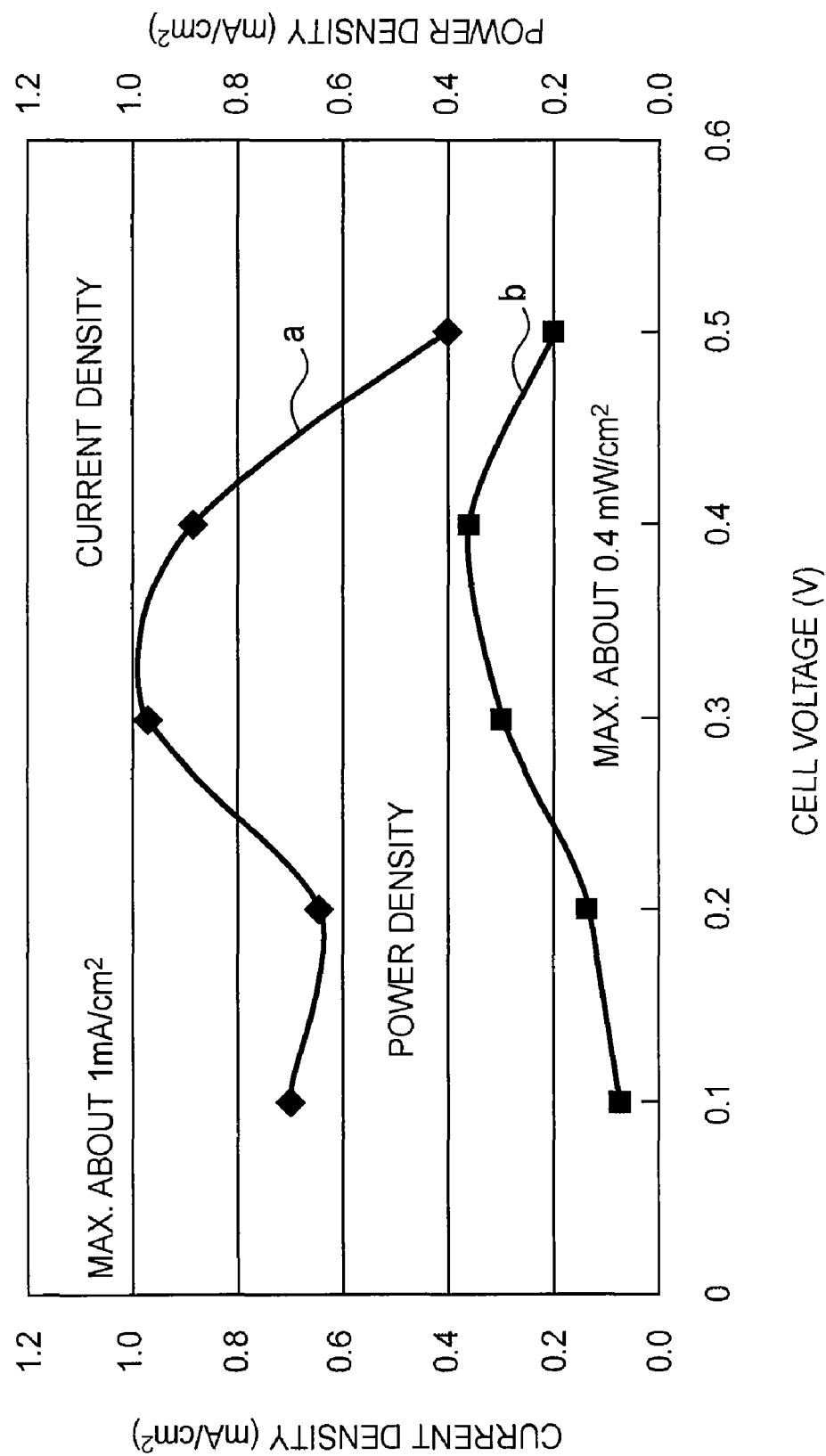
FIG. 14 is a diagram showing the results of the measurement of current-voltage characteristics of the fuel cell used in the evaluation in Example 4 of the present invention.

As shown in FIG. 13B, a load 47 was connected to the Ti current collectors 41, 42, and a starch/buffer solution was charged as a fuel into the recessed portion 44a in the clamp plate 44 to perform power generation. The working temperature was 25° C. FIG. 14 shows the current-voltage characteristics of this fuel cell. The open circuit voltage is about 0.86 V. In FIG. 14, a curved line a indicates a current density, and a curved line b indicates a power density. As shown in FIG. 14, the current density is about 1 mA/cm$^2$ at the maximum and the power density is about 0.4 mW/cm$^2$ at the maximum, which indicates that both values are high.

Hereinabove, one embodiment and Examples of the present invention are described in detail, but the present invention is not limited to the above embodiment or Examples and can be changed or modified based on the technical concept of the present invention.

For example, values, structures, constructions, forms, and materials mentioned in the above embodiment and Examples are merely examples, and, if necessary, a value, structure, construction, form, or material different from the above may be used.

Specifically, for example, the form of the fuel cell or fuel cartridge 32 may be a form different from that mentioned in the above embodiment or Examples.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An apparatus comprising a fuel cell for generating electric power by decomposing a fuel using an enzyme, the fuel comprising a polysaccharide, and the enzyme comprising a decomposing enzyme for promoting decomposition of the polysaccharide to form a monosaccharide and an oxidase for promoting oxidation of the monosaccharide formed to decompose the monosaccharide, wherein the fuel and the enzyme are selected from the group consisting of:
- (a) the fuel comprising maltose, and the enzyme comprising α-glucosidase and glucose dehydrogenase;
- (b) the fuel comprising sucrose, and the enzyme comprising sucrase and glucose dehydrogenase; and
- (c) the fuel comprising lactose, and the enzyme comprising β-galactosidase and glucose dehydrogenase.

2. An electronic device comprising a fuel cell, wherein the fuel cell generates electric power by decomposing a fuel using an enzyme, the fuel comprising a polysaccharide, and the enzyme comprising a decomposing enzyme for promoting decomposition of the polysaccharide to form a monosaccharide and an oxidase for promoting oxidation of the monosaccharide formed to decompose the monosaccharide, wherein the fuel and the enzyme are selected from the group consisting of:
- (a) the fuel comprising maltose, and the enzyme comprising α-glucosidase and glucose dehydrogenase;
- (b) the fuel comprising sucrose, and the enzyme comprising sucrase and glucose dehydrogenase; and
- (c) the fuel comprising lactose, and the enzyme comprising β-galactosidase and glucose dehydrogenase.

3. A movable body comprising a fuel cell, wherein the fuel cell generates electric power by decomposing a fuel using an enzyme, the fuel comprising a polysaccharide, and the enzyme comprising a decomposing enzyme for promoting decomposition of the polysaccharide to form a monosaccharide and an oxidase for promoting oxidation of the monosaccharide formed to decompose the monosaccharide, wherein the fuel and the enzyme are selected from the group consisting of:
- (a) the fuel comprising maltose, and the enzyme comprising α-glucosidase and glucose dehydrogenase;
- (b) the fuel comprising sucrose, and the enzyme comprising sucrase and glucose dehydrogenase; and
- (c) the fuel comprising lactose, and the enzyme comprising β-galactosidase and glucose dehydrogenase.

4. A power generation system comprising a fuel cell, wherein the fuel the cell generates electric power by decomposing a fuel using an enzyme, the fuel comprising a polysaccharide, and the enzyme comprising a decomposing enzyme for promoting decomposition of the polysaccharide to form a monosaccharide and an oxidase for promoting oxidation of the monosaccharide formed to decompose the monosaccharide, wherein the fuel and the enzyme are selected from the group consisting of:
- (a) the fuel comprising maltose, and the enzyme comprising α-glucosidase and glucose dehydrogenase;
- (b) the fuel comprising sucrose, and the enzyme comprising sucrase and glucose dehydrogenase; and
- (c) the fuel comprising lactose, and the enzyme comprising β-galactosidase and glucose dehydrogenase.

5. A cogeneration system comprising a fuel cell, wherein the fuel cell generates electric power by decomposing a fuel using an enzyme, the fuel comprising a polysaccharide, and the enzyme comprising a decomposing enzyme for promoting decomposition of the polysaccharide to form a monosaccharide and an oxidase for promoting oxidation of the monosaccharide formed to decompose the monosaccharide, wherein the fuel and the enzyme are selected from the group consisting of:
- (a) the fuel comprising maltose, and the enzyme comprising α-glucosidase and glucose dehydrogenase;
- (b) the fuel comprising sucrose, and the enzyme comprising sucrase and glucose dehydrogenase; and
- (c) the fuel comprising lactose, and the enzyme comprising β-galactosidase and glucose dehydrogenase.

\* \* \* \* \*